Nov. 16, 1926.

J. M. KANE 1,607,001

CORN SHELLER

Filed April 19, 1926

Inventor:
John M. Kane,
By Samuel N. Pond, atty.

Patented Nov. 16, 1926.

1,607,001

UNITED STATES PATENT OFFICE.

JOHN M. KANE, OF KANKAKEE, ILLINOIS.

CORN SHELLER.

Application filed April 19, 1926. Serial No. 102,902.

This invention relates to corn shellers, having reference more particularly to corn shellers of the well-known cylinder type which employ a stationary horizontal cylinder formed throughout its lower half with a series of spaced shelling bars, and a rotatable beater extending through said cylinders equipped with radial teeth which co-operate with the shelling bars of the cylinder to shell the corn from the cob.

One object of my present invention is to provide an improved construction of cylinder sheller which will operate to keep the ears of corn in lengthwise position while being rolled against the co-operating shelling elements of the cylinder so as to more thoroughly remove the corn from the cob. Other objects of the invention are to provide a cylinder sheller wherein the cylinder may be provided with auxiliary means, in addition to the usual sheller bars, for stripping the corn from the cob; to provide a cylinder sheller wherein such auxiliary means will also exert a tendency to feed the ears of corn through the cylinder; and to provide an improved construction of beater.

Still other objects and attendant advantages of the invention will be apparent to persons skilled in the art as the same becomes better understood by reference to the following detailed description, taken in connection with the accompanying drawing wherein I have illustrated a practical and approved embodiment of the novel features of the invention, and in which—

Fig. 1 is a vertical longitudinal section through my improved sheller;

Fig. 2 is an end view from the left of Fig. 1 on an enlarged scale;

Fig. 3 is an enlarged cross-section taken in the plane of the line 3—3 of Fig. 1; and Fig. 4 is a detail view in side elevation of one of the side walls of the casing showing its corrugated inner face.

Referring to the drawing, my improved casing comprises a pair of vertical side walls conveniently consisting of inwardly facing channel bars 5, an arcuate top plate 6 connecting the upper edges of the side walls 5, and an arcuate group of longitudinal shelling bars 7 connecting the lower edges of the side walls 5. Communicating with the receiving end of the casing is the usual feed hopper 8, and communicating with the discharge end is a discharge chute 9 for shelled ears. The ends of the side walls 5 are supported upon a pair of transversely disposed channel beams 10 and 11, which latter also serve to support the ends of the shelling bars 7; the top wall or cover 6 of the casing and the transverse channel bar 10 also serving to support the feed hopper 8.

Integral with or suitably attached to the feed hopper 8 and the discharge chute 9 are bearings 12 and 13 in which is journaled a beater shaft 14 that extends through the lower end of the feed hopper, through the casing, and above the discharge chute. Fast on the portion of the shaft 14 underlying the feed hopper 8 is a drum section 15 formed on its periphery with the usual spiral cams 16 which operate to feed the ears of corn into the beater casing; and on another portion of the shaft 14 just inwardly of the discharge end of the casing is a drum section 17 formed on its periphery with similar spiral cams 18 which function to discharge the cobs into the delivery chute 9. Fast on the shaft 14 between the drum sections 15 and 17 are several beater sections disposed end to end, and each comprising a drum section 19 formed on its periphery with a pair of longitudinally extending ribs or fins 20 one hundred and eighty degrees apart, and, midway between said ribs with radially projecting teeth 21. The beater sections are preferably so disposed that the ribs of one section are in line with the teeth of an adjacent section.

On the inner faces of the vertical side walls 5 of the casing are longitudinally extending corrugations 22 which, as best shown in Fig. 4, are preferably downwardly and forwardly inclined in order to produce an automatic forward feed of the ears of corn through the casing. These corrugations are preferably given the triangular cross-sectional form shown in Fig. 3, and they are relatively inverted on the two side walls 5, so that the corrugations on one side present sharp upper edges 22', while those on the opposite wall present similar sharp lower edges. As the ears of corn are rolled by the ribs and teeth of the beater over the corrugations 22 of the side walls, a considerable portion of the corn is shelled from the cob in such rolling operation, to that extent aiding the shelling action of the beater in rolling the cobs over the shelling bars 7. The combined action of the corrugated side walls and the shelling bars effects a very thorough and clean shelling, and the inclined corrugations further maintain a gradual feed of the ears toward the discharge end of the sheller; and this is accomplished without breaking the cobs or crushing the shelled corn. I have found that this construction of sheller works well on even a thin volume of corn, and presents less frictional resistance than the standard cylinder sheller.

For cleaning the shelled corn there is preferably provided a circular screen 23 mounted at its ends on annular heads or rings 24. These heads are peripherally toothed, and rest upon and in engagement with a pair of pinions 25 and 26 (Fig. 3) mounted on shafts 27 and 28 respectively journaled in and between the supporting channel bars 10 and 11. One of these shafts, 28 as herein shown, is driven from the beater shaft 14 by a sprocket 29 on the beater shaft, a sprocket 30 on the screen drive shaft 28, and a connecting sprocket chain 31; the shaft 14 being driven from a power shaft 32 by bevel gears 33 and 34. The rotary screen herein shown encircling the sheller casing provides a more compact construction as well as a more efficient construction than the reciprocating screen or sieve heretofore usually employed beneath the sheller cylinder.

While I have herein shown and described one practical embodiment of the principle of the invention, it is manifest that changes in structural detail and relative arrangement of the parts may be resorted to without departing from the principle of the invention or sacrificing any of the advantages thereof. Hence I reserve all such variations and modifications as fall within the spirit and purview of the appended claims.

I claim—

1. In a corn sheller of the type described, the combination of a casing formed with side walls having vertical inner faces and longitudinal corrugations on said inner faces and with a group of longitudinal shelling bars spanning the space between the lower edges of said side walls, of a rotary beater in said casing carrying on its end portions ear feeding and cob ejecting devices and on its intermediate portion radial projections co-operating with said corrugations and shelling bars to shell the corn from the cob.

2. A specific embodiment of claim 1, wherein the longitudinal corrugations on the inner faces of the side walls are downwardly and forwardly inclined.

3. A specific embodiment of claim 1, wherein the longitudinal corrugations on the inner face of one wall present sharp upper edges and those on the inner face of the opposite wall present sharp lower edges.

4. A specific embodiment of claim 1, wherein the longitudinal corrugations are downwardly and forwardly inclined, and wherein also the corrugations on the inner face of one wall present sharp upper edges and those one the inner face of the opposite wall present sharp lower edges.

5. A beater for a cylinder corn sheller, comprising a rotatable shaft and a plurality of beater sections fast on said shaft, each of said beater sections formed with longitudinal ribs and with radial teeth alternating with said ribs around the periphery of the beater section; said beater sections being disposed end to end with the ribs of each section longitudinally aligned with the teeth of an adjacent section.

JOHN M. KANE.